United States Patent [19]
Chaudhary et al.

[11] Patent Number: 6,160,029
[45] Date of Patent: Dec. 12, 2000

[54] OLEFIN POLYMER AND α-OLEFIN/VINYL OR α-OLEFIN/VINYLIDENE INTERPOLYMER BLEND FOAMS

[75] Inventors: Bharat I. Chaudhary, Pearland, Tex.; Martin H. Tusim, Midland, Mich.; Russell P. Barry, Gamshurst, Germany

[73] Assignee: The Dow Chemical Company, Midland, Mich.

[21] Appl. No.: 09/521,169

[22] Filed: Mar. 8, 2000

Related U.S. Application Data

[60] Provisional application No. 60/123,813, Mar. 11, 2000, provisional application No. 60/123,814, Mar. 11, 2000, provisional application No. 60/126,887, Mar. 30, 2000, and provisional application No. 60/126,888, Mar. 30, 2000.

[51] Int. Cl.[7] ....................................... C08J 9/14
[52] U.S. Cl. ............................. 521/139; 521/81
[58] Field of Search ....................... 521/139, 81

[56] References Cited

U.S. PATENT DOCUMENTS

| | | | |
|---|---|---|---|
| 3,284,421 | 11/1966 | Breslow | 260/80.5 |
| 3,504,068 | 3/1970 | Zizisperger et al. | 264/41 |
| 3,573,152 | 3/1971 | Wiley et al. | 161/60 |
| 3,644,230 | 2/1972 | Cronin | 260/2.5 E |
| 3,645,992 | 2/1972 | Elston | 260/80.78 |
| 3,953,558 | 4/1976 | Hatano et al. | 264/22 |
| 4,076,698 | 2/1978 | Anderson et al. | 526/348.6 |
| 4,214,054 | 7/1980 | Watanabe et al. | 521/95 |
| 4,311,628 | 1/1982 | Abdou-Sabat et al. | 260/33.6 |
| 4,323,528 | 4/1982 | Collins | 264/53 |
| 4,379,859 | 4/1983 | Hirosawa et al. | 521/59 |
| 4,464,484 | 8/1984 | Yoshimura et al. | 521/58 |
| 4,824,720 | 4/1989 | Malone | 428/294 |
| 5,026,798 | 6/1991 | Canich | 526/127 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,132,380 | 7/1992 | Stevens et al. | 526/126 |
| 5,188,192 | 2/1993 | LaPointe et al. | 556/11 |
| 5,224,996 | 7/1993 | Ghys et al. | 118/325 |
| 5,266,627 | 11/1993 | Meverden et al. | 524/527 |
| 5,272,236 | 12/1993 | Lai et al. | 526/348.5 |
| 5,278,272 | 1/1994 | Lai et al. | 526/348.5 |
| 5,321,106 | 6/1994 | LaPointe | 526/126 |
| 5,347,024 | 9/1994 | Nickias et al. | 556/11 |
| 5,350,723 | 9/1994 | Neithamer et al. | 502/104 |
| 5,374,696 | 12/1994 | Rosen et al. | 526/126 |
| 5,399,635 | 3/1995 | Neithamer et al. | 526/126 |
| 5,424,016 | 6/1995 | Kolosowski | 264/156 |
| 5,470,993 | 11/1995 | Devore et al. | 556/11 |
| 5,585,058 | 12/1996 | Kolosowski | 264/156 |
| 5,652,315 | 7/1997 | Inoue et al. | 526/153 |
| 5,703,187 | 12/1997 | Timmers | 526/282 |
| 5,721,185 | 2/1998 | LaPointe et al. | 502/117 |
| 5,817,705 | 10/1998 | Wilkes et al. | 521/79 |
| 5,869,591 | 7/1999 | McKay et al. | 525/210 |
| 5,883,213 | 3/1999 | Arai et al. | 526/347 |
| 5,911,940 | 6/1999 | Walton et al. | 264/51 |
| 5,977,271 | 11/1999 | McKay | 525/195 |
| 5,993,707 | 11/1999 | Chaudhary et al. | 521/139 |
| 6,020,393 | 2/2000 | Khemani | 521/79 |
| 6,048,909 | 4/2000 | Chaudhary et al. | 521/139 |
| 6,077,878 | 6/2000 | Okura et al. | 521/79 |

FOREIGN PATENT DOCUMENTS

| | | | |
|---|---|---|---|
| 416815 B1 | 8/1997 | European Pat. Off. | C07F 7/10 |
| 514828 B1 | 11/1997 | European Pat. Off. | C07F 7/28 |
| 7/278230 | 10/1995 | Japan | C08F 210/02 |
| 92 19439 | 11/1992 | WIPO | B29C 67/20 |
| 94 00500 | 1/1994 | WIPO | C08F 10/00 |
| 95 32095 | 11/1995 | WIPO | B32B 27/32 |
| 97 22455 | 6/1997 | WIPO | B29C 44/56 |
| 97 26287 | 7/1997 | WIPO | C08F 210/02 |
| 98 09999 | 3/1998 | WIPO | C08F 210/02 |
| 98 10015 | 3/1998 | WIPO | C08L 23/02 |

OTHER PUBLICATIONS

Makromol. Chem., Longo and Grassi, vol. 191, pp. 2387–2396, 1990.

Polymer Sequence Determination, Academic Press, New York, pp. 71–78, 1997.

Polymer Preprints, Arai et al, vol. 39, No. 1, pp. 220–221, 1998.

Polymer Preprints, Am. Chem. Soc., Arai et al, vol. 38, pp. 349–350, 1997.

Macromol. Chem. Phys., Sernetz and Mulhaupt, vol. 197, pp. 1071–1083, 1997.

Plastic Materials, Brysdon, 5$^{th}$ edition, pp. 426–429, Butterworths, 1989.

Plastics Foams, Part II; Frisch et al., pp. 544–595, Marcel Dekker, Inc. 1973.

Plastics Technology, p. 25, Sep. 1992.

Journal of Applied Polymer Science, Lu et al., vol. 53, pp. 1453–1460, 1994.

Polymer Preprints, Am. Chem., Soc., Div. Polym. Chem., Xu and Lin, vol. 35, pp. 686–687; 1994.

Journal of Applied Polymer Science, D'Annielle et al, vol., 58, pp. 1701–1706, 1995.

*Primary Examiner*—Morton Foelak

[57] ABSTRACT

A polymer blend foam having smooth skin and/or an open-cell content of at least 20 volume percent, a crosslinked gel content of no greater than 10 percent, a minimum cross-sectional area of at least 1000 mm$^2$, and a density of no greater than 250 kg/m$^3$. The blend includes (A) a substantially random interpolymer having polymerized therein (1) a vinyl or vinylidene aromatic monomer and/or a sterically hindered aliphatic or cycloaliphatic vinyl or vinylidene monomer, and (2) one or more of ethylene and a C$_{3-20}$ aliphatic α-olefin; and (B) an olefin polymer based on one or more of ethylene, C$_{3-20}$ aliphatic α-olefins, and C$_{3-20}$ aliphatic α-olefins containing polar groups. The olefin polymer (B) lacks any of the vinyl or vinylidene aromatic monomers found in (A).

19 Claims, No Drawings

OLEFIN POLYMER AND α-OLEFIN/VINYL OR α-OLEFIN/VINYLIDENE INTERPOLYMER BLEND FOAMS

CROSS-REFERENCE TO RELATED APPLICATIONS

This application is a Rule 53(B2) Continuation In Part of four (4) prior Provisional Applications. The applications are: Ser. No. 60/123,813, filed Mar. 11, 2000; Ser. No. 60/123,814, filed Mar. 11, 2000; Ser. No. 60/126,887, filed Mar. 30, 2000; and Ser. No. 60/126,888, filed Mar. 30, 2000.

BACKGROUND OF THE INVENTION

This invention relates generally to polymer foams based upon a blend of an olefin polymer and at least one of an alpha-olefin (α-olefin)/vinyl monomer interpolymer and an α-olefin/vinylidene monomer interpolymer. The vinyl and vinylidene monomers may be aromatic, sterically hindered aliphatic, or cycloaliphatic. This invention relates particularly to open cell polymer foams based upon such blends, especially where the foams are soft and flexible and, preferably, of low density. This invention also relates to low density polymer foams (either open cell or closed cell) based upon such blends that more preferably have a skin that is smooth, aesthetically appealing and, still more preferably, functionally improved relative to foams prepared solely from an olefin polymer. These foams are preferably substantially free of cross-linking as evidenced by a low insoluble gel content.

A variety of thermoplastic polymers find their way into polymer foams. Certain thermoplastic polymers foam more readily than others do to provide structures with a variety of useful properties and dimensions. For example, polystyrene is an amorphous polymer that foams over a relatively broad range of temperatures, producing foams with a wide range of open-cell contents. On the other hand, semi-crystalline polymers typically foam over a narrow temperature range (relative to polystyrene) as their viscosities and melt strengths drop rapidly as temperatures exceed their respective crystalline melting points. This usually results in foams with a predominantly closed-cell configuration. One means of increasing melt strength of semi-crystalline polymers, thereby broadening the temperature range and improving a range of processing characteristics, involves lightly cross-linking the polymers by peroxides, irradiation or other conventional means. Even then, the resulting foams typically have a configuration that is predominantly closed-cell (less than 20 volume percent (vol %) open cell content).

Non-cross-linked, low-density olefinic polymer foams typically have rough skins upon manufacture. As the foams age, skin roughness may increase due to foams shrinkage or expansion. The rough skin lacks aesthetic appeal in many applications (e.g., cushion packaging). This leads to its removal at the time of final foam fabrication and results in wasted material.

PCT publication number WO/9810015 describes blends of polyolefins and α-olefin/vinylidene monomer interpolymers. Examples 26, 27 and 29–31 relate to foam materials prepared from such blends. Example 26 reports foam materials with a width of 32 millimeters (mm) and a thickness of either 15 mm or 17 mm. Example 27 has a width of 34.5 mm and a thickness of 19 mm. Examples 29–31 show closed cell foam preparation (less than (<) 20 percent (%) open cell content), but do not report foam size.

SUMMARY OF THE INVENTION

One aspect of this invention is a polymer foam having a crosslinked gel content of no greater than 10%, (preferably with a minimum cross-sectional area of at least 1000 mm$^2$), and a density $\leq$250 kilograms per cubic meter (kg/m$^3$), wherein at least 70 percent by weight (wt %) of polymers in the foam comprises a blend of:

(A) from 5 to 60 wt %, based on the combined weight of components (A) and (B), of at least one substantially random interpolymer having a melt index of 0.05 to 1000 grams per 10 minutes (g/10 min), either a crystalline melting point ($T_m$) or a glass transition temperature ($T_g$) of about 80° C. or less, whichever is appropriate, and:

(1) from 8 to 65 mole percent (mol %) of its monomeric units derived from;

(a) at least one vinyl or vinylidene aromatic monomer, or (b) at least one sterically hindered aliphatic or cycloaliphatic vinyl or vinylidene monomer, or (c) a combination of at least one aromatic vinyl or vinylidene monomer and at least one sterically hindered aliphatic or cycloaliphatic vinyl or vinylidene monomer, and (2) from 35 to 92 mol % of its monomeric units derived from ethylene, an aliphatic α-olefin containing from 3 to 20 carbon atoms (C$_{3-20}$), or a mixture thereof; and having at least 80 mol % of its monomeric units derived from (1) and (2); and (B) from 95 to 40 wt %, based on the combined weight of components (A) and (B), of at least one polymer having no monomeric units derived from (1)(a), (1)(b), or (1)(c), and at least 80 mol % of its monomeric units derived from monomers selected from ethylene, C$_{3-20}$ aliphatic α-olefins, and a C$_{3-20}$ aliphatic α-olefin that contains a polar group. The blend may contain other polymerizable monomers; and the foam may contain one or more conventional foam promoters, additives or both. The foam may also have an open cell content of at least 20 volume percent (vol %), based upon total foam volume. One need not use cross-linking to increase polymer melt strength, add fillers, such as carbon black, that rupture cell walls, or mechanically rupture cell walls in order to reach such an open cell content.

The glass transition temperatures ($T_g$) and crystalline melting points ($T_m$) of component (A) or (B) are measured using a differential scanning calorimeter (DSC). The following procedure is used for the DSC measurements: the sample is heated rapidly to 180° C.; kept at 180° C. for 4 minutes to ensure complete melting; cooled at 10° C./min to about 40° C. below the expected $T_g$; kept at this temperature for four minutes for DSC stabilization; and heated to 150° C. at 10° C./min. The $T_m$ is obtained from the melting curve and is the peak melting temperature. $T_g$ is obtained using the half-height method from the DSC melting curve (also called second heat).

The present invention also relates to an extrusion foaming process for preparing the polymer foam. The process comprises:

(I) converting the blend into a polymer melt;

(II) introducing, at an elevated pressure, at least one blowing agent into the polymer melt to form a foamable gel, the blowing agent being present in a total amount of from 0.2 to 5.0 gram-moles per kilogram (g-M/kg) of polymers contained in the polymer melt;

(III) cooling the foamable gel to an optimum temperature; and (IV) extruding the foamable gel from Step III through a die to a region of lower pressure to form a foam.

DETAILED DESCRIPTION OF THE PREFERRED EMBODIMENTS

All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

Unless otherwise stated, all ranges include both endpoints and all numbers between the endpoints.

"Hydrocarbyl" means any aliphatic, cycloaliphatic, aromatic, aryl substituted aliphatic, aryl-substituted cycloaliphatic, aliphatic substituted aromatic, or aliphatic substituted cycloaliphatic groups. "Hydrocarbyloxy" means a hydrocarbyl group having an oxygen linkage between it and the carbon atom to which it is attached. "Aliphatic" means a compound having a straight- or branched-chain arrangement of its carbon atoms.

"Copolymer" means a polymer having polymerized therein monomeric units derived from two different monomers.

"Interpolymer" means a polymer having polymerized therein monomeric units derived from at least two different monomers. This includes copolymers, terpolymers and tetrapolymers. "Monomeric unit" refers to a polymer backbone portion that is derived from a single monomer.

"Open-cell foam" refers to foam with an open-cell content of at least ($\geq$) 20 vol % according to ASTM D2856-94. "Soft foam" means a foam having an Asker C hardness of <80, preferably <70, more preferably <60 at a foam density of 250 kg/m$^3$ or less ($\leq$)

Component (A)

"Substantially random interpolymers" (SRIPs) of the present invention have a monomer distribution capable of description by a Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferred SRIPs have a vinyl aromatic monomer distribution such that $\leq 15\%$ of total vinyl aromatic monomer content occurs in vinyl aromatic monomer blocks of more than (>) 3 units. More preferably, the interpolymer lacks a high degree of either isotacticity or syndiotacticity. This means that, in its carbon-13 nuclear magnetic resonance (C$^{13}$-NMR) spectrum, a SRIP has peak areas corresponding to main chain methylene and methine carbons representing either meso diad sequences or racemic diad sequences that do not exceed 75% of the total peak area of main chain methylene and methine carbons.

The SRIPs present in foams of the present invention as part of component (A) result from polymerizing i) one or more of ethylene and a C$_{3-20}$ aliphatic α-olefin monomer, ii) one or more of vinyl or vinylidene aromatic monomers and sterically hindered aliphatic or cycloaliphatic vinyl or vinylidene monomers, and, optionally, (iii) up to 20 mol % of a polymerizable ethylenically unsaturated monomer other than that of i) and ii). The interpolymers have $\geq 80$ mol %, preferably $\geq 90$ mol % and more preferably 100 mol % of their monomer units derived from (i) and (ii).

Suitable α-olefins are aliphatic α-olefins containing from 3 to 20, preferably from 3 to 12, more preferably from 3 to 8 carbon atoms (C$_{3-20}$, C$_{3-12}$, C$_{3-8}$). As used herein, subscripts indicate the number of, for example carbon (C) atoms contained in a monomer. Particularly suitable α-olefins include ethylene, propylene, butene-1, 4-methyl-1-pentene, hexene-1 or octene-1, or ethylene in combination with one or more of propylene, butene-1, 4-methyl-1-pentene, hexene-1 and octene-1. Other optional polymerizable ethylenically unsaturated comonomers include norbornene and C$_{1-10}$ alkyl or C$_{6-10}$ aryl substituted norbornenes, with an exemplary interpolymer being ethylene/styrene/norbornene.

Vinyl or vinylidene aromatic monomers suitable for use in Component (A) include those represented by the formula:

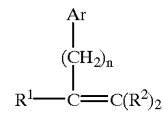

wherein R$^1$ is a radical selected from hydrogen and lower (C$_{1-4}$) alkyl radicals, preferably hydrogen or methyl; each R$^2$ is a radical independently selected from hydrogen and C$_{1-4}$ alkyl radicals, preferably hydrogen or methyl; Ar is a phenyl group or a phenyl group substituted with from 1 to 5 substituents or moieties selected from a halogen (or halo-), C$_{1-4}$ alkyls, and C$_{1-4}$ haloalkyls; and n is an integer from zero (0) to 4, preferably from 0 to 2, most preferably 0. Exemplary vinyl aromatic monomers include styrene, vinyl toluene, α-methylstyrene, t-butyl styrene, chlorostyrene, as well as their isomers. Particularly suitable vinyl aromatic monomers include styrene and its lower alkyl(C$_{1-4}$)- or halogen (e.g. chlorine or bromine)-substituted derivatives. Preferred monomers include styrene, α-methyl styrene, lower alkyl or phenyl-ring substituted derivatives of styrene, such as ortho-, meta-, and para-methylstyrene, ring halogenated styrenes, para-vinyl toluene or mixtures thereof. A more preferred vinyl aromatic monomer is styrene.

A "sterically hindered aliphatic or cycloaliphatic vinyl or vinylidene compound" is an addition polymerizable vinyl or vinylidene monomer corresponding to the formula:

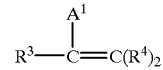

wherein A$^1$ is a C$_{6-20}$ cyclic aliphatic group, tert-butyl, or a substituted or unsubstituted norbornyl group; R$^3$ is hydrogen or a C$_{1-4}$ alkyl group, preferably hydrogen or methyl; each R$^4$ is independently selected from hydrogen or a C$_{1-4}$ alkyl group, preferably hydrogen or methyl; or, alternatively, R$^3$ and A$^1$ together form a ring system.

Preferred aliphatic or cycloaliphatic vinyl or vinylidene compounds include monomers in which one of the carbon atoms bearing ethylenic unsaturation is tertiary or quaternary substituted. Examples of suitable A$^1$ substituents include cyclohexyl, cyclohexenyl, and cyclooctenyl. More preferred compounds include various isomeric vinyl-ring substituted derivatives of cyclohexene and substituted cyclohexenes, and 5-ethylidene-2-norbornene. Especially suitable compounds include 1-, 3-, and 4-vinylcyclohexene.

SRIP preparation includes polymerizing a mixture of polymerizable monomers in the presence of one or more metallocene or constrained geometry catalysts in combination with various cocatalysts, as described in EP-A-0,416,815 and U.S. Pat. No. 5,703,187, both of which are incorporated herein by reference in their entirety. Preferred polymerization conditions include pressures from atmospheric up to 3000 atmospheres (304 megapascals (MPa)) and temperatures from −30° C. to 200° C. Polymerization and unreacted monomer removal at temperatures above monomer autopolymerization temperatures of the respective monomers may convert some monomer into its respective homopolymer by a mechanism such as free radical polymerization.

Examples of suitable catalysts for preparing SRIPs and process conditions are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

SRIP preparation suitably occurs at temperatures of from −30° C. to 250° C. in the presence of a catalyst represented by the formula:

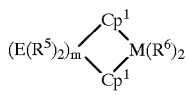

wherein: each $Cp^1$ is independently, for each occurrence, a substituted cyclopentadienyl group p-bound to M; E is C or Si; M is a group IV metal, preferably Zr or Hf, most preferably Zr; each $R^5$ is independently, in each occurrence, H, hydrocarbyl, silahydrocarbyl, or hydrocarbylsilyl, containing up to 30, preferably from 1 to 20, more preferably from 1 to 10 carbon (C) or silicon (Si) atoms; each $R^6$ is independently, in each occurrence, H, halo, hydrocarbyl, hydrocarbyloxy, silahydrocarbyl, hydrocarbylsilyl containing up to 30, preferably from 1 to 20, more preferably from 1 to 10 C or Si atoms or two $R^6$ groups together can be a $C_{1-10}$ hydrocarbyl substituted 1,3-butadiene; and m is 1 or 2. Optionally, but preferably, polymerization occurs in the presence of an activating cocatalyst. Particularly suitable substituted cyclopentadienyl groups include those illustrated by the formula:

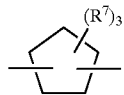

wherein each $R^7$ is independently, in each occurrence, H, hydrocarbyl, silahydrocarbyl, or hydrocarbylsilyl and contains up to 30, preferably from 1 to 20, more preferably from 1 to 10 C or Si atoms or two $R^7$ groups together form a divalent derivative of such group. Preferably, $R^7$ is independently, in each occurrence (including where appropriate all isomers), hydrogen (H), methyl, ethyl, propyl, butyl, pentyl, hexyl, benzyl, phenyl or silyl or (where appropriate) two such $R^7$ groups are linked together forming a fused ring system such as indenyl, fluorenyl, tetrahydroindenyl, tetrahydrofluorenyl, or octahydrofluorenyl.

Particularly preferred catalysts include, for example, racemic-dimethylsilanediyl)-bis-(2-methyl-4-phenylindenyl) zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)-bis-(2-methyl-4-phenylindenyl) zirconium di-$C_{1-4}$ alkoxide, or any combination thereof.

Suitable titanium-based constrained geometry catalysts include [N-(1,1-dimethylethyl)-1,1-dimethyl-1-[(1,2,3,4,5-h)-1,5,6,7-tetrahydro-s-indacen- 1-yl]silanaminato(2-)-N] titanium dimethyl; (1-indenyl)(tert-butylamido)dimethyl-silane titanium dimethyl; ((3-tert-butyl)(1,2,3,4,5-h)-1-indenyl)(tert-butylamido) dimethylsilane titanium dimethyl; and ((3-iso-propyl)(1,2,3,4,5-h)-1-indenyl)(tert-butyl amido)dimethylsilane titanium dimethyl, or any combination thereof.

Other methods of preparing interpolymers suitable for use in the present invention are described in various references. Longo and Grassi (Makromol. Chem., Volume 191, pages 2387 to 2396 [1990]) and D'Anniello et al. (Journal of Applied Polymer Science, Volume 58, pages 1701–1706 [1995]) report the use of a catalytic system based on methylalumoxane (MAO) and cyclopentadienyl-titanium trichloride ($CpTiCl_3$) to prepare an ethylene-styrene copolymer. Xu and Lin (Polymer Preprints, Am. Chem. Soc., Div. Polym. Chem.) Volume 35, pages 686,687 [1994]) report using a $MgCl_2/TiCl_4/NdCl_3/Al(iBu)_3$ catalyst to give random copolymers of styrene and propylene. Lu et al (Journal of Applied Polymer Science, Volume 53, pages 1453 to 1460 [1994]) describe the copolymerization of ethylene and styrene using a $TiCl_4/NdCl_3/MgCl_2/Al(Et)_3$ catalyst. Sernetz and Mulhaupt, (Macromol. Chem. Phys., v. 197, pp. 1071–1083, 1997) describe the influence of polymerization conditions on the copolymerization of styrene with ethylene using $Me_2Si(Me_4Cp)$ (N-tert-butyl)$TiCl_2$-/methylaluminoxane Ziegler-Natta catalysts. Arai, Toshiaki and Suzuki (Polymer Preprints, Am. Chem. Soc., Div. Polym describe copolymers of ethylene and styrene produced by bridged metallocene catalysts. Chem.) Volume 38, pages 349, 350 [1997]) and in U.S. Pat. No. 5,652,315. The manufacture of α-olefin/vinyl aromatic monomer interpolymers such as propylene/styrene and butene/styrene are described in U.S. Pat. No. 5,244,996 or U.S. Pat. No. 5,652,315 or as disclosed in DE 197 11 339 A1. All the above methods disclosed for preparing the interpolymer component are incorporated herein by reference. Also, although of high isotacticity and therefore not "substantially random", the random copolymers of ethylene and styrene as disclosed in Polymer Preprints Vol. 39, No. 1, March 1998 by Toru Aria et al. can also be employed as blend components in making foams of the present invention.

SRIPs can also be prepared by the methods described in JP 07/278230 employing compounds shown by the general formula:

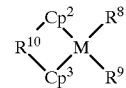

where $Cp^2$ and $Cp^3$ are cyclopentadienyl groups, indenyl groups, fluorenyl groups, or substituents of these, independently of each other; $R^8$ and $R^9$ are H atoms, halogen atoms, $C_{1-12}$ hydrocarbon groups, alkoxyl groups, or aryloxyl groups, independently of each other; M is a group IV metal, preferably zirconium (Zr) or hafnium (Hf), most preferably Zr; and $R^{10}$ is an alkylene group or silanediyl group used to cross-link $Cp^2$ and $Cp^3$.

SRIPs can also be prepared by methods described in WO 95/32095; WO 94/00500; and in Plastics Technology, p. 25 (September 1992), all of which are incorporated herein by reference in their entirety. Also suitable are SRIPs that comprise at least one α-olefin/vinyl aromatic/vinyl aromatic/α-olefin tetrad as disclosed in U.S. application Ser. No. 08/708,869 filed Sep. 4, 1996 and WO 98/09999.

SRIP preparation may also yield an amount of atactic vinyl aromatic homopolymer. The amount typically produces few detrimental effects relative to the present invention and can be tolerated. If desired, one may separate such homopolymer from the desired interpolymer by conventional techniques. For purposes of the present invention, the amount is desirably <30 wt %, and preferably <20 wt %, based on combined weight of interpolymer and atactic vinyl aromatic homopolymer.

SRIPs may be modified by conventional methods such as grafting, hydrogenation and, functionalization such as by sulfonation or chlorination.

The SRIPs have a vinyl or vinylidene aromatic monomer and/or a sterically hindered aliphatic or cycloaliphatic monomer content (1) that is preferably from 8 to 65 (8–65), and more preferably 15–65 mol %. The interpolymers also have an ethylene and/or $C_{3-20}$ aliphatic α-olefin content (2) that is preferably 35–92, and more preferably 35–85 mol %, especially when preparing smooth-skinned foams. The mole percentages are based upon combined moles of (1) and (2) and in each instance total 100 mol %.

SRIP (component (A)) has a melt index ($I_2$) that is desirably 0.05–1000, preferably 0.1–100, and more preferably 0.2–50 g/10 min as measured by American Society for Testing and Materials (ASTM Test D1238, 190° C. entigrade (° C.)/2.16 kilogram (kg) weight). It also has a molecular weight distribution (weight average molecular weight/number average molecular weight ($M_w/M_n$) or MWD) of 1.5–20, preferably 1.8–10, and more preferably 2–5.

Component (B)

Olefinic polymers suitable for use as blend component (B) include those having no monomeric units derived from a vinyl or vinylidene aromatic monomer or a sterically hindered aliphatic or cycloaliphatic vinyl or vinylidene monomer and ≧80 mol %, preferably ≧90 mol % and more preferably 100 mol %, based on total moles of monomeric units, of their monomeric units derived from ≧1 monomer selected from ethylene, unsubstituted $C_{3-20}$ aliphatic α-olefins, or polar group-containing aliphatic $C_{3-20}$ α-olefins. The olefinic polymers may be homopolymers, copolymers or interpolymers. Suitable polar group-containing aliphatic α-olefin monomers include, e.g., ethylenically unsaturated nitriles such as acrylonitrile, methacrylonitrile or ethacrylonitrile; ethylenically unsaturated anhydrides such as maleic anhydride; ethylenically unsaturated amides such as acrylamide or methacrylamide; ethylenically unsaturated carboxylic acids (both mono- and difunctional) such as acrylic acid or methacrylic acid; esters (especially lower, e.g. $C_{1-6}$ alkyl esters) of ethylenically unsaturated carboxylic acids such as methyl methacrylate, ethyl acrylate, hydroxyethyl-acrylate, n-butyl acrylate or methacrylate, or 2-ethyl-hexylacrylate; ethylenically unsaturated dicarboxylic acid imides such as N-alkyl or N-aryl maleimides such as N-phenyl maleimide. Preferred polar group-containing monomers include acrylic acid, vinyl acetate, maleic anhydride and acrylonitrile. The olefinic polymers may contain a halogen such as fluorine, chlorine or bromine. Preferred halogen-containing olefinic polymers include chlorinated polyethylenes (CPEs). Preferred olefinic polymers include homopolymers or interpolymers of ethylene or an aliphatic (including cycloaliphatic) $C_{2-18}$ α-olefin. Examples of such preferred polymers include homopolymers of ethylene or propylene, and interpolymers of two or more $C_{2-18}$ α-olefin monomers. Other preferred olefinic polymers include interpolymers of ethylene and one or more other $C_{3-8}$ α-olefins such as 1-butene, 4-methyl-1-pentene, 1-hexene or 1-octene.

While substantial freedom from cross-linking may be preferred, one may employ conventional means to lightly cross-link the polymers in either or both of components (A) and (B) such that the polymers exhibit increased shear thinning, but remain thermoplastic. Such means include, for example, irradiation, use of a coupling agent such as (but not limited to) an azide or a peroxide. This level of cross-linking tends to increase polymer melt strength that leads, in turn, to improvements in at least one of foamability, interfacial strength and mechanical properties. Examples of polymers modified in this fashion are PROFAX™ PF814 (a product of Montell) and DAPLOY™ 130D (a product of Borealis) high melt strength PP.

"Coupling agent", as used herein, means a compound or mixture of compounds used for purposes of coupling and, optionally, foaming, a polymer or polymer blend. Typical coupling compounds are polyfunctional and capable of insertion reactions into C—H bonds. Such polyfunctional compounds have ≧ two, preferably two, functional groups capable of C—H insertion reactions.

Suitable coupling agents include, but are not limited to the peroxide-, silane-, sulfur-, radiation-, or azide-based cure systems. A full description of various cross-linking technologies is described in copending U.S. patent application Ser. Nos. 08/921,641 and 08/921,642, both filed on Aug. 27, 1997 and incorporated herein by reference in their entirety. Dual cure systems, which use a combination of heat, moisture cure, and radiation steps, may be effectively employed. Dual cure systems are disclosed and claimed in U.S. patent application Ser. No. 536,022, filed on Sep. 29, 1995, the teachings of which are incorporated herein by reference. For instance, it may be desirable to employ peroxide coupling agents in conjunction with silane coupling agents, peroxide coupling agents in conjunction with radiation, sulfur-containing coupling agents in conjunction with silane coupling agents, etc.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—$N_3$) such as tetramethylenebis(azidoformate) (see U.S. Pat. No. 3,284,421);, sulfonyl azides (R—$SO_2$—$N_3$), phosphoryl azides ((RO)$_2$—(PO)—$N_3$), phosphinic azides ($R_2$—P(O)—$N_3$)and silyl azides ($R_3$—Si—$N_3$).

The poly(sulfonyl azides) are any compounds having ≧ two reactive sulfonyl azide groups (—$SO_2N_3$). Preferred poly(sulfonyl azides) have a structure X-R-X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between a SRIP and a sulfonyl azide, more preferably ≧1, more preferably ≧2, most preferably ≧3 carbon, oxygen or silicon, preferably carbon, atoms between functional groups.

"Inertly substituted" refers to substitution with atoms or groups that do not undesirably interfere with the desired reaction(s) or desired properties of the resulting crosslinked polymers. Such groups include fluorine aliphatic or aromatic ether, siloxanes, as well as sulfonyl azide groups when > two SRIP chains are to be joined. Suitable structures include R as aryl, alkyl, aryl alkaryl, arylalkyl silane, or heterocyclic, groups and other groups that are inert and separate the sulfonyl azide groups as described. More preferably R includes ≧ one aryl group between the sulfonyl groups, most preferably ≧ two aryl groups (such as when R is 4,4' diphenylether or 4,4'-biphenyl). When R is one aryl group, the group preferably has > one ring, as in the case of naphthylene bis(sulfonyl azides). Poly(sulfonyl)azides include such compounds as 1, 5-pentane bis(sulfontlazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of 1–8 chlorine atoms and 2–5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

The poly(sulfonyl azide) and the polymer or blend to be coupled are mixed at a first temperature that is ≧ the melting point of the lowest melting component of the blend and, after mixing, are heated to react at a second temperature which is > the first temperature and is, and is usually >100° C. and most frequently >150° C. The preferred temperature range depends on the nature of the azide that is used.

For coupling, the sulfonyl azide is admixed with the polymer and heated to at least the decomposition temperature of the sulfonyl azide. "Decomposition temperature" means that temperature at which an azide converts to its corresponding sulfonyl nitrene, eliminating nitrogen and heat in the process, as determined by differential scanning calorimetry (DSC).

Other suitable coupling agents include phenols, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See, *Encyclopedia of Chemical Technology*, Vol. 17, 2nd edition, Interscience Publishers, 1968; and *Organic Peroxides*, Daniel Seern, Vol. 1, Wiley-Interscience, 1970).

Suitable peroxides include aromatic diacyl peroxides; aliphatic diacyl peroxides; dibasic acid peroxides; ketone peroxides; alkyl peroxyesters; alkyl hydroperoxides (e.g. diacetylperoxide); dibenzoylperoxide; bis-2,4-dichlorobenzoyl peroxide; di-tert-butyl peroxide; dicumylperoxide; tert-butylperbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; and butyl hydroperoxide.

Suitable phenols are disclosed in U.S. Pat. No. 4,311,628, the disclosure of which is incorporated herein by reference. One example of a phenolic cure agent is the condensation product of a halogen substituted phenol or a $C_1$–$C_{10}$ alkyl substituted phenol with an aldehyde in an alkaline medium, or by condensation of bifunctional phenoldialcohols.

Suitable aldehyde-amine reaction products include formaldehyde-ammonia; formaldehyde-ethylchloride-ammonia; acetaldehyde-ammonia; formaldehyde-aniline; butyraldehyde-aniline; and heptaldehyde-aniline.

Suitable substituted ureas include trimethylthiourea; diethylthiourea; dibutylthiourea; tripentylthiourea; 1,3-bis (2-benzothiazolylmercaptomethyl)urea; and N,N-diphenylthiourea.

Suitable substituted guanidines include diphenylguanidine; di-o-tolylguanidine; diphenylguanidine phthalate; and the di-o-tolylguanidine salt of dicatechol borate.

Suitable substituted xanthates include zinc ethylxanthate; sodium isopropylxanthate; butylxanthic disulfide; potassium isopropylxanthate; and zinc butylxanthate.

Suitable dithiocarbamates include copper dimethyl-, zinc dimethyl-, tellurium diethyl-, cadmium dicyclohexyl-, lead dimethyl-, lead dimethyl-, selenium dibutyl-, zinc pentamethylene-, zinc didecyl-, and zinc isopropyloctyl-dithiocarbamate.

Suitable thiazoles include 2-mercaptobenzothiazole, zinc mercaptothiazolyl mercaptide, 2-benzothiazolyl-N,N-diethylthiocarbamyl sulfide, and 2,2'-dithiobis (benzothiazole).

Suitable imidazoles include 2-mercaptoimidazoline and 2-mercapto-4,4,6-trimethyldihydropyrimidine.

Suitable sulfenamides include N-t-butyl-2-benzothiazole-, N-cyclohexylbenzothiazole-, N,N-diisopropylbenzothiazole-, N-(2,6-dimethylmorpholino)-2-benzothiazole-, and N,N-diethylbenzothiazole-sulfenamide.

Suitable thiuramidisulfides include N,N'-diethyl-, tetrabutyl-, N,N'-diisopropyldioctyl-, tetramethyl-, N,N'-dicyclohexyl-, and N,N'-tetralauryl-thiuramidisulfide.

Alternatively, silane coupling agents may be employed. In this regard, any silane that will effectively graft the polymers of this invention can be used. Suitable silanes include unsaturated silanes that comprise an ethylenically unsaturated hydrocarbyl group, such as a vinyl, allyl, isopropenyl, butenyl, cyclohexenyl or γ-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes include unsaturated alkoxy silanes that can be grafted onto a polymer. These silanes and their method of preparation are more fully described in U.S. Pat. No. 5,266,627, the teachings of which are incorporated herein by reference. Vinyl trimethoxy silane (VTMOS), vinyl triethoxy silane, γ-(meth)acryloxy propyl trimethoxy silane and mixtures of these silanes are the preferred silane coupling agents for use in this invention.

The olefinic polymers may also contain up to 20 mol % of monomeric units based on other non-aromatic, interpolymerizable monomers such as a $C_4$–$C_{20}$ diene, preferably butadiene or 5-ethylidene-2-norbornene. The olefinic polymers can be further characterized by their degree of long or short chain branching (LCB or SCB) and the distribution thereof.

Olefinic polymers such as traditional LCB low density polyethylene (LDPE) may be produced by a high pressure polymerization process using a free radical initiator. When used in the present composition, LDPE usually has a density (ρ)<0.94 g/cc (ASTM D 792) and a melt index ($I_2$) of 0.01–100, preferably 0.1–50 g/10 min (ASTM Test D 1238, condition I).

Olefinic polymers that lack LCB, such as linear low density polyethylene polymers (heterogeneous LLDPE) or linear high density polyethylene polymers (HDPE), typically result from a Ziegler polymerization process. U.S. Pat. No. 4,076,698 discloses one such process. These olefinic polymers may also be referred to as "heterogeneous polymers".

When used in the present invention, HDPE usually consists mainly of long linear polyethylene chains. The HDPE has a ρ≧0.94 g/cc (ASTM-D1505), and an $I_2$ (ASTM-1238, condition I) of 0.01–100, and preferably 0.1–50 g/10 min.

Heterogeneous LLDPE generally has a ρ of 0.85–0.94 g/cc (ASTM D 792), and an $I_2$ (ASTM-1238, condition I) of 0.01–100, preferably 0.1–50 g/10 min. LLDPE preferably has polymerized therein ethylene and at least one $C_{3-18}$, more preferably at least one $C_{3-8}$, α-olefin. Preferred (α-olefins include 1-butene, 4-methyl-1-pentene, 1-hexene and 1-octene.

Other suitable olefinic polymers include those commonly referred to as uniformly branched or homogeneous polymers, one example of which is homogeneous LLDPE. Homogeneous polymers contain no LCB and have only branches derived from the monomers (if having more than two carbon atoms). Homogeneous polymers include those made as described in U.S. Pat. No. 3,645,992, and those made using so-called single site catalysts in a batch reactor having relatively high olefin concentrations (as described in U.S. Pat. No. 5,026,798 and U.S. Pat. No. 5,055,438). The uniformly branched, homogeneous polymers typically have a random comonomer distribution within a given interpolymer molecule and similar ethylene/comonomer ratios between interpolymer molecules.

A suitable homogeneous LLDPE has a ρ of 0.85–0.94 g/cc (ASTM D 792), and an $I_2$ (ASTM-1238, condition I) of 0.01–100, and preferably 0.1–50 g/10 min. Homogeneous LLDPE desirably results from the same monomers as heterogeneous LLDPE.

A particularly suitable group of olefinic polymers is sometimes referred to as substantially linear ethylene/α-olefin polymers or substantially linear ethylene polymers (collectively referred to as "SLEP"). A SLEP has a processibility similar to LDPE, but the strength and toughness of LLDPE. Like traditional homogeneous polymers, a SLEP has a single melting peak, as opposed to traditional Ziegler polymerized heterogeneous linear ethylene/α-olefin (EAO) interpolymers that have two or more melting peaks (determined using differential scanning calorimetry or DSC). U.S. Pat. No. 5,272,236 and U.S. Pat. No. 5,278,272, the teachings of which are incorporated herein by reference, disclose SLEPs and their preparation.

Suitable SLEPs have a ρ (ASTM D-792) of 0.85 g/cc–0.97 g/cc, preferably 0.85 g/cc–0.955 g/cc, and especially 0.85 g/cc–0.92 g/cc. The SLEPS also have an $I_2$ (ASTM D-1238, Condition 190° C./2.16 kilogram (kg)) of 0.01–1000 g/10 min, preferably 0.01–100 g/10 min, and especially 0.01–10 g/10 min.

Other suitable olefinic polymers include ultra low molecular weight ethylene polymers and EAO interpolymers described in allowed United States patent application (Ser. No. 09/359,486, filed Jul. 22, 1999) and its Patent Cooperation Treaty (PCT) counterpart (WO 97/26287 published Jul. 24, 1997), the teachings of which are incorporated herein by reference. These EAO interpolymers have an $I_2$ >1,000 g/10 min, or a $M_n$ <11,000.

A SLEP can be a homopolymer of a $C_2$–$C_{20}$ α-olefin, such as ethylene, propylene, or 4-methyl-1-pentene. It can also be an interpolymer of ethylene with at least one of a $C_3$–$C_{20}$ α-olefin, a $C_2$–$C_{20}$ acetylenically unsaturated monomer or a $C_4$–$C_{18}$ diolefin. A SLEP interpolymer may also polymerized therein one or more other unsaturated monomers.

Preferred olefin polymers suitable for use as component (B) include at least one of LDPE, HDPE, heterogeneous and homogeneous LLDPE, SLEP, polypropylene (PP), including isotactic polypropylene, syndiotactic and rubber toughened polypropylenes, or ethylene-propylene interpolymers (EP), chlorinated polymers such as CPE, ethylene-vinyl acetate copolymers (EVA), and ethylene-acrylic acid copolymers (EAA). For EVA, EAA and CPE, the $I_2$ (ASTM D-1238, Condition 190° C./2.16 kg) is generally 0.01–1000 g/10 min, preferably 0.01–100 g/10 min, and especially 0.01–10 g/10 min. Satisfactory PP has a melt flow rate or MFR (ASTM D-1238, Condition 230° C./2.16 kg) of 0.01–1000 g/10 min, preferably 0.01–100 g/10 min, and especially 0.01–10 g/10 min.

Blend Compositions

In blends of components (A) and (B), Component (A) is present in an amount ≧5 wt % of the blend, preferably ≧15 wt %, and most preferably ≧20 wt %, but preferably ≦60 wt %, still more preferably ≦55 wt % and most preferably ≦50 wt %. All percentages are based on combined weight of components (A) and (B). Accordingly, preferred amounts of component (B) simply equal the difference between 100 wt % and the amount of component (A).

Using more than 60 wt % of component A in the polymer blend will result in foam collapse, with the resulting product having a density greater than 250 kg/m³. Using less than 5 wt % of component A in the polymer blend will not yield significant increase in open cell content or significant improvement in skin quality (i.e., smoothness).

The blends may be prepared by any suitable means known in the art such as, for example, dry blending in a pelletized form in desired proportions followed by melt blending in an apparatus such as a screw extruder or a Banbury mixer. Dry blended pellets may be directly melt processed into a final solid state article by, for example, injection molding. The blends may also be made by direct polymerization without isolating blend components. Direct polymerization may use, for example, one or more catalysts in a single reactor or two or more reactors in series or parallel and vary at least one of operating conditions, monomer mixtures and catalyst choice.

The polymer portion of the foam of the invention may, if desired, contain ≦30 wt % of a polymer other than (A) or (B). However, the polymer portion of the foam preferably consists of ≧70 wt % of components (A) and (B), based on the total weight of the polymers, more preferably ≧90 wt %, and most preferably 100 wt %.

In selecting polymer blend constituents, a polymer viscosity match tends to improve mixing and minimize problems such as voids in a foam body or blistering on a foam surface. This leads, in turn, to improved foam properties.

The polymer blend compositions described above may be converted to foam products using any conventional process. Foam products include, for example, extruded thermoplastic polymer foam, extruded polymer strand foam, expandable thermoplastic foam beads, expanded thermoplastic foam beads or expanded and fused thermoplastic foam beads. The foam products may be converted into fabricated articles using any conventional process or method. For example, any one or more of expansion, coalescing and welding may be used in making such articles, especially from expandable foam beads. The foam products may take any known physical configuration, such as extruded sheet, round, rod, plank, and profiles. One may also mold expandable beads into any known configuration that employs foam products, including, but not limited to the foregoing configurations.

Conventional LDPE foam processes have a significant limitation in terms of a temperature range over which suitable foams may be made. That range is frequently no more than 1° C. Polymer blend foams of the present invention have a broader temperature range of 2–6° C. This allows for greater control in selecting foam properties such as open cell content.

Polymer foams of the present invention readily result from conventional foam preparation techniques. Using a conventional extrusion foaming process by way of example, one converts polymer blend components into a polymer melt and incorporates a blowing agent into the polymer melt to form a foamable gel. One then extrudes the foamable gel through a die to form a desired product. Depending upon the die and operating conditions, the product may vary from an extruded foam plank or rod through a coalesced foam strand product, to foam beads and eventually to chopped strands of foamable beads.

Prior to extruding foamable gel through the die, one typically cools the gel to an optimum temperature. To make a foam, the optimum temperature is typically above each component's polymer glass transition temperature ($T_g$), or for those having sufficient crystallinity to have a melt temperature ($T_m$), near the $T_m$. "Near" means at, above, or below and largely depends upon where stable foam exists. The temperature desirably falls within 30° centigrade (° C.) above or below the $T_m$. For foams of the present invention, an optimum foaming temperature is in a range in which the foam does not collapse.

The blowing agent may be incorporated or mixed into the polymer melt by any means known in the art such as with an extruder, mixer, or blender. The blowing agent is mixed with the polymer melt at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting.

Components (A) and (B) may be dry-blended and fed to an extruder hopper. Component (A) may also be added to an extruder after component (B) is at least partially in a melt state. When so added, component (A) may be part of a polymer concentrate that may include other additives or ingredients such as a pigment.

In order to optimize foam physical characteristics, one typically cools foamable gel from a temperature that promotes melt mixing to a lower temperature before passing the gel through a die. The gel may be cooled in the extruder or other mixing device or in separate coolers.

When making extruded foam, extruded strand foam or foam beads, the cooled, foamable gel passes through a die of desired shape (with an appropriate number of apertures) and enters a zone of reduced or lower pressure that promotes foaming. The zone of lower pressure is at a pressure lower than that in which the foamable gel is maintained prior to extrusion through the die. The lower pressure may be superatmospheric or subatmospheric (vacuum), but is preferably at an atmospheric level.

The present foam structures may be formed in a coalesced strand form by extrusion of the compositions of the present invention through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. U.S. Pat. No. 3,573,152 and U.S. Pat. No. 4,824,720, the teachings of which are incorporated herein by reference, disclose apparatus and methods used in making coalesced foam structures.

Foams of the present invention may also be made using an accumulating extrusion process and apparatus such as that shown in U.S. Pat. No. 4,323,528 and U.S. Pat. No. 5,817, 705, the teachings of which are incorporated herein by reference. This apparatus, commonly known as an "extruder-accumulator system" allows one to operate a process on an intermittent, rather than a continuous, basis. The apparatus includes a holding zone or accumulator where foamable gel remains under conditions that preclude foaming. The holding zone is equipped with an outlet die that opens into a zone of lower pressure, such as the atmosphere. The die has an orifice that may be open or closed, preferably by way of a gate that is external to the holding zone. Operation of the gate does not affect the foamable composition other than to allow it to flow through the die. Opening the gate and substantially concurrently applying mechanical pressure on the gel by a mechanism (e.g. a mechanical ram) forces the gel through the die into a zone of lower pressure. The mechanical pressure is sufficient to force foamable gel through the die at a rate fast enough to preclude significant foaming within the die yet slow enough to minimize and preferably eliminate generation of irregularities in foam cross-sectional area or shape. As such, other than operating intermittently, the process and its resulting products closely resemble those made in a continuous extrusion process.

The present foam structures may also be formed into foam beads suitable for molding into articles by expansion of pre-expanded beads containing a blowing agent. The beads may be molded at the time of expansion to form articles of various shapes. Processes for making expanded beads and molded expanded beam foam articles are described in *Plastic Foams, Part II*, Frisch And Saunders, pp. 544–585, Marcel Dekker, Inc. (1973) and *Plastic Materials*, Brydson, 5th Ed., pp. 426–429, Butterworths (1989).

Expandable and expanded beads can be made by a batch or by an extrusion process. The batch process of making expandable beads is similar to manufacturing expandable polystyrene (EPS). Impregnate polymer blend granules, made either by melt blending or in-reactor blending, with a blowing agent in an aqueous suspension or in an anhydrous state in a pressure vessel at an elevated temperature and pressure. Either discharge the granules rapidly into a region of reduced pressure to expand the granules into foam beads or cool and discharge the granules as unexpanded beads. In a separate step, heat the unexpanded beads to expand them, e.g., with steam or with hot air.

The extrusion method tracks with the conventional foam extrusion process described above up to the die orifice. The die has multiple holes. In order to make unfoamed beads, immediately quench the foamable strands exiting the die orifice in a cold water bath to prevent foaming and then pelletize the quenched strands. Alternately, convert the strands to foam beads by cutting the strands into pellets or granules at the die face and allowing the granules to expand.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. Some of the methods are taught in U.S. Pat. No. 3,504,068 and U.S. Pat. No. 3,953,558, both incorporated herein by reference. C. P. Park, supra, p. 191, pp. 197–198, and pp. 227–229, provides excellent teachings, incorporated herein by reference, of the above processes and molding methods.

U.S. Pat. No. 4,379,859 and U.S. Pat. No. 4,464,484, the teachings of which are incorporated herein by reference, disclose preparation of foam beads. When making foam beads rather than foam, first convert blends used to prepare foams of the present invention into discrete resin particles such as granulated resin pellets. Suspend the particles in a liquid medium, such as water, in which they are substantially insoluble and then introduce a blowing agent into the liquid medium. Use of an elevated temperature and pressure in a pressure vessel such as an autoclave facilitates impregnating the particles with the blowing agent. Rapidly discharge the impregnated particles from the pressure vessel into an atmosphere or a region of reduced pressure to expand the particles into foam beads.

A variation of the foregoing extrusion process readily yields expandable thermoplastic polymer beads. The variation requires (a) cooling the foamable gel to a temperature below that at which foaming occurs, (b) extruding cooled gel through a die containing one or more orifices to form a corresponding number of essentially continuous expandable thermoplastic strands, and (c) pelletizing the expandable thermoplastic strands to form expandable thermoplastic beads.

Any conventional blowing agent may be used to make foams of the present invention. Such conventional blowing agents fall into three generic classes: inorganic blowing agents, organic blowing agents and chemical blowing agents. Suitable inorganic blowing agents include nitrogen, sulfur hexafluoride ($SF_6$), argon, water, air and helium. Organic blowing agents include (without limitation) carbon dioxide ($CO_2$), aliphatic $C_{1-9}$ hydrocarbons, aliphatic $C_{1-3}$ alcohols, and fully and partially halogenated aliphatic $C_{1-4}$ hydrocarbons. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluoro-carbons. Examples of fluorocarbons include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloro-ethane, 1,1-dichloro-1-fluoroethane (HCFC-141b), l-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitroso-terephthalamide, trihydrazino triazine and mixtures of citric acid and sodium bicarbonate such as the various products sold under the name Hydrocerol™ (a product of Boehringer Ingelheim). Any of the foregoing blowing agents may be used singly or in combination with one or more other blowing agents.

The blowing agent or blowing agent combination is present in an amount sufficient to convert the polymer melt into a foamable gel. The amount is desirably 0.2–5.0, preferably 0.5–3.0, and more preferably 0.7–2.5 gram-moles of blowing agent per kilogram of polymer present in the polymer melt.

One may also add a nucleating agent to the polymer melt or foamable gel in order to control foam cell size. Preferred nucleating agents include inorganic substances such as calcium carbonate, talc, clay, silica, barium stearate, diatomaceous earth, and mixtures of citric acid and sodium bicarbonate. Other nucleating agents conventionally used in preparing polymer foams may also be used. When used, the nucleating agent is present in an amount within a range from >0 to 5 parts by weight per hundred parts by weight of polymer (phr) present in the polymer melt. The range is preferably from >0 to 3 phr.

Various conventional additives may be incorporated into foams of the present invention. The additives include, without limitation, inorganic fillers, conductive fillers, pigments, antioxidants, acid scavengers, flame retardants, ultraviolet absorbers, processing aids, extrusion aids, permeability modifiers, anti-static agents, and other thermoplastic polymers. Certain of the additives, such as inorganic and conductive fillers, may also function as nucleating agents, promote formation of open cells or both.

Permeability modifiers (or stability control agents) may be added to the present foam to enhance dimensional stability. Preferred agents include amides and esters of $C_{10}$–$C_{24}$ fatty acids. U.S. Pat. No. 3,644,230 and U.S. Pat. No. 4,214,054, the teachings of which are incorporated herein by reference, disclose such agents. Monoesters may also reduce static during and after foam manufacture. Examples of preferred agents include stearyl stearamide, glycerol monostearate, glycerol monobehenate, and sorbitol monostearate. When present, such agents are used in an amount within a range of from >0 to 10 phr, based on polymer in the foamable gel.

Perforating foams of the present invention enhances or accelerates a gaseous permeation exchange wherein blowing agent exits from the foam and air enters into the foam. The resulting perforated foams have defined therein a multiplicity of channels that are preferably free of direction with respect to the longitudinal extension of the foam. The channels extend from one foam surface at least partially through the foam, and sometimes completely through the foam from one external surface to another external surface. The channels desirably occur over substantially an entire exterior foam surface, preferably with uniform or substantially uniform spacing. Suitable spacing intervals may be up to and including 2.5 centimeters (cm), preferably up to and including 1.3 cm. U.S. Pat. No. 5,424,016, U.S. Pat. No. 5,585,058, WO 92/19439 and WO 97/22455, the teachings of which are incorporated herein by reference, provide excellent information relative to perforation.

If desired, the foams of this invention may be post-treated by any known means to increase foam open cell content. Such post-treatment methods include, without limit, mechanically compressing the foam and expanding the foam by exposure to steam or hot air.

Foams of the present invention exhibit excellent dimensional stability. Preferred foams retain >80 percent of their initial volume when measured one month after an initial volume measurement within 30 seconds after foam expansion. Volume measurement may use any suitable method such as cubic displacement of water.

Foams of the present invention are substantially free of cross-linking as indicated by a cross-linked gel content of ≦10%, based upon total weight of foam or polymer (ASTM D-2765–84, Method A). While the cross-linked gel content is desirably as low as possible, foam properties suffer no adverse effects from a very small amount of cross-linking, such as that which occurs naturally without using cross-linking agents or radiation.

Foams of the present invention have a $\rho \leq 250$, desirably <150, preferably <100, more preferably <80 and most preferably 5–100 kg/m$^3$ (in accordance with ASTM D3575-93, Suffix W, Method B). The foams have an average cell size of 0.05–10.0, desirably 0.1–5.0, and preferably 0.2–3.0 millimeters (mm) (ASTM D3576). The foams have an open cell content that varies from 0.01 vol % to 99.9 vol %, depending upon component selection and process condition variations. Foams with an open cell content of <20 vol % generally fall in a class known as closed cell foams. Those known as open cell foams typically have an open cell content of $\geq 20$ vol %, preferably $\geq 25$ vol %, and more preferably $\geq 30$ vol %. The open cell content is desirably $\leq 100$ vol %, preferably $\leq 95$ vol %, and more preferably $\leq 90$ vol % (ASTM D2856-94), based on the total volume of foam.

The foams have an Asker-C hardness of $\leq 80$, desirably $\leq 70$, and preferably $\leq 60$. Hardness measurements of the foams use an Asker C durometer for cellular rubber and yarn in accordance with ASTM D2240-97, but with a 5 mm diameter spherical indentor.

The foams of the invention desirably have a minimum cross-sectional area of $\geq 1000$ mm$^2$, preferably $\geq 1500$ mm$^2$, and most preferably $\geq 2000$ mm$^2$. "Minimum cross-sectional area" refers to the smallest cross sectional area of the foam. For example, a 50-mm wide×20-mm thick×3-meter (m) long plank-shaped foam has a minimum cross sectional area of 1000 mm$^2$. If the foam is in the shape of a sheet or plank, it has a thickness that is $\geq 1$ mm, desirably $\geq 3$ mm, preferably $\geq 5$ mm, and more preferably $\geq 7$ mm. It has a width that is desirably $\geq 50$ mm, preferably $\geq 75$ mm, and more preferably $\geq 1000$ mm. As used herein "thickness" of a foam plank or sheet refers to its smallest cross-sectional dimension (e.g. as measured from one planar surface to an opposing planar surface). When the foam is present as a round or rod, it has a diameter that is desirably $\geq 40$ mm, preferably >50 mm, and preferably $\geq 75$ mm.

The foam has a drop-test optimum C-factor (ASTM-D1596) of <6, desirably <5, and preferably $\leq 4$.

The foams of the present invention may be used in any application where foams of comparable density and open or closed cell contents are used today. Such applications include, without limit, cushion packaging (e.g. corner blocks, braces, saddles, pouches, bags, envelopes, overwraps, interleafing, encapsulation) of finished electronic goods such as computers, televisions, and kitchen appliances; packaging or protection of explosive materials or devices; material handling (trays, tote boxes, box liners, tote box inserts and dividers, shunt, stuffing, boards, parts spacers and parts separators); work station accessories (aprons, table and bench top covers, floor mats, seat cushions); automotive (headliners, impact absorption in bumpers or doors, carpet underpayment, sound insulation); flotation (e.g. life jackets, vests and belts); sports and leisure (e.g. gym mats and bodyboards); thermal insulation such as that used in building and construction); acoustical insulation (e.g. for appliances and building and construction); gaskets, grommets, seals; sound attenuation for printers and typewriters; display case insert; missile container padding; military shell holder; blocking and bracing of various items in transport; preservation and packaging; automotives anti-rattle pads, seals; medical devices, skin contact pads; cushioned pallet; and vibration isolation pad. The foregoing list merely illustrates a number of suitable applications. Skilled artisans can readily envision additional applications without departing from the scope or spirit of the present invention.

The following examples illustrate, but do not in any way limit the scope of the present invention. Arabic numerals illustrate examples of the invention and letters of the alphabet designate comparative examples. All parts and percentages are by weight and all temperatures are in ° C. unless otherwise stated.

Test Methods

Use $I_2$ (ASTM D-1238, condition 190° C./2.16 kg (formerly known as "condition (e)")) as a molecular weight indicator of component (A) SRIPs.

Use proton nuclear magnetic resonance ($^1$H NMR) to determine SRIP styrene content and atactic polystyrene (aPS) concentration. Prepare proton NMR samples in 1, 1, 2, 2-tetrachloroethane-d$_2$ (tce-d$_2$) to yield solutions containing 1.6–3.2 wt % polymer, based on total solution weight. Use polymer $I_2$ as a rough guide in determining sample concentration, with 3.2 wt % for an $I_2$ >2 g/10 min, 2.4 wt % for an $I_2$ between 1.5 and 2 g/10 min, and 1.6 wt % for an $I_2$ <1.5 g/10 min. A suitable apparatus and associated operating conditions are a Varian vxr 300 with a sample probe at 80° C., referenced to the residual protons of tce-d$_2$ at 5.99 parts per million (ppm), sweep width=5000 Hz, acquisition time=3.002 sec, pulse width=8 $\mu$sec, frequency=300 MHz and delay=1 sec. Use a sample of polystyrene having a $M_w$ of 192,000 as a standard.

Polymerization Method for Ethylene-Styrene Interpolymers (ESIs) #1–3, 5–7

Using $^1$H-cyclopenta[1]phenanthrene-2-yl)dimethyl(t-butylamido)-silanetitanium 1,4-diphenylbutadiene as a catalyst, prepare ESI's #1–3, 5–6 in a continuously operating loop reactor (36.8 gallon (gal) 139 liter (L) capacity) equipped with an Ingersoll-Dresser twin screw pump for mixing. Run the reactor liquid full at 475 psig (3,275 kilopascals (kPa)) with a residence time of approximately 25 minutes. Feed raw materials and catalyst/cocatalyst flows into the pump's suction side through injectors and Kenics™ static mixers. Discharge material from the pump into a 2" diameter line supplying two Chemineer-Kenics™ 10–68 Type BEM Multi-Tube heat exchangers in series (both containing twisted tapes to increase heat transfer). Upon exiting the last exchanger, loop flow returns through the injectors and static mixers to the pump's suction side. Take off an exit stream from the loop reactor between the two exchangers.

Feed solvent to the reactor from two different sources. Use a fresh stream of toluene to provide flush flow for the reactor seals (20 lb/hr (9.1 kg/hr). Mix recycle solvent with uninhibited styrene monomer on the suction side of five 8480-5-E Pulsafeeder™ diaphragm pumps connected in parallel to supply solvent and styrene to the reactor at 650 pounds per square inch gauge (psig) (4,583 kPa).

Supply an ethylene stream to the reactor at 687 psig (4,838 kPa). Introduce hydrogen into the ethylene stream and then combine the ethylene/hydrogen mixture with the solvent/styrene stream at ambient temperature before it enters the reactor. Cool the combined stream to 2° C. as it enters the reactor loop.

Stop polymerization by adding catalyst kill (water mixed with solvent) to product from the reactor and then recover product in the form of dry polymer pellets (<1000 ppm total volatiles).

Polymerization Method for ESI #4

Prepare ESI #4 in a 6 gal (22.7 L), oil-jacketed, Autoclave continuously stirred tank reactor (CSTR) running liquid full at 475 psig (3,275 kPa). Supply toluene solvent to the reactor at 30 psig (207 kPa). Supply uninhibited styrene monomer to the reactor at 30 psig (207 kpa). Using an ethylene supply pressure of 600 psig (4,137 kPa), prepare a combined stream as in preparing ESI #1–3, 5 and 6, but feed it to the reactor at a temperature of 5° C. Recover polymer product in the form of dry polymer products in a manner similar to that used in recovering ESI #1–3, and 5–7.

The various catalysts, co-catalysts and process conditions used to prepare the various individual ethylene styrene interpolymers (ESI #1–7) are summarized in Table 1 and their properties are summarized in Table 2. All samples used tris(pentafluorophenyl)borane (FAB)(CAS#001109-15-5) (Boulder Scientific) as a cocatalyst and a modified methylaluminoxane (MMAO) (CAS# 146905-79-5) (Akzo Nobel, MMAO-3A)as a scavenger. Other than ESI-1, prepared with (t-butylamido)dimethyl (tetramethylcyclo-pentadienyl) silane-titanium (II) 1,3-pentadiene as a catalyst, all ESI preparation used (1H-cyclopenta[1]-phenanthrene-2-yl) dimethyl(t-butylamido)-silanetitanium 1,4-diphenylbutadiene) as the means catalyst.

LDPE-2=LDPE ($I_2$ of 1.8 g/10 min and a $\rho$ of 0.923 g/cm$^3$).
LDPE-3=LDPE ($I_2$ of 2.0 g/10 min and a $\rho$ of 0.924 g/cm$^3$).
PP-1=high melt strength PP (Montell PROFAX™ PF814).
PP-2=homopolymer PP (Montell PROFAX™ 6823).
Antioxidant=IRGANOX™ 1010 (Ciba).
Nucleator =Talc or HYDROCEROL™ CF40E (Boehringer Ingelheim).
Permeability modifier=glycerol monostearate.

EXAMPLE (Ex) 1 AND COMPARATIVE EXAMPLES (Comp Ex A and B)

Using a foam apparatus comprising a single screw extruder, mixer, coolers and foaming die, prepare foam product from the compositions shown in Table 3 at foaming temperatures shown in Table 3. All samples used HYDROCEROL™ CF40E (Boehringer Ingelheim) as nucleator, 0.06 phr of IRGANOX™ 1010 and other than sample 1e, which used none, 0.5 phr of glycerol monostearate, all amounts being based on 100 parts by weight of total polymer weight. Subject resulting foams to physical property testing as shown in Table 3. The dimensions of the boards have a thickness range of 9–25 mm and a width range of 115–158 mm to provide a cross-sectional area >1000 mm$^2$.

Make $\rho$, open-cell content, cell size, compressive strength (at 25% compression), and compression set measurements

TABLE 1

PREPARATION CONDITIONS FOR ESI #'S 1–7

| ESI # | REACTOR TEMP ° C. | SOLVENT FLOW LB/HR | ETHYLENE FLOW LB/HR | HYDROGEN FLOW SCCM | STYRENE FLOW LB/HR | ETHYLENE % CONVERSION | B/TI Ratio | MMAO/-TI RATIO |
|---|---|---|---|---|---|---|---|---|
| 1 | 90   | 580   | 50   | 30  | 50  | 92    | 3.0  | 3.3 |
| 2 | 88.0 | 590   | 55   | 250 | 133 | 94.0  | 3.50 | 4.9 |
| 3 | 61.0 | 386   | 20   | 0   | 100 | 88    | 3.50 | 2.5 |
| 4 | N/A  | 34.99 | 4.01 | 10  | 3   | 90.94 | 3.01 | 5   |
| 5 | 100  | 432   | 64   | 650 | 36  | 97    | 4.0  | 6.0 |
| 6 | 74   | 315   | 24   | 50  | 70  | 93    | 5.3  | 8.2 |
| 7 | 79   | 799   | 65   | 700 | 250 | 95    | 3.7  | 6.0 |

N/A = not available

ESI #8 and ESI #9 are, respectively, ESI #2 and ESI ™3 from Table 15 of WO 98/10015.

in accordance with ASTM Test Method Nos. D3575-93 (Suffix W, Method B), D2856-94, D2856-94, D3573-93

TABLE 2

PROPERTIES OF ESI # S 1–7.

| EST # | WT % COPOLYMER STYRENE | MOL % COPOLYMER STYRENE | aPS WT % | $I_2$ (g/10 min) | PEAK CRYSTALLINE MELTING POINT, $T_m$ (° C.) | $T_g$ (° C.) |
|---|---|---|---|---|---|---|
| 1 | 31.1 | 10.8 | 2.6 | 1.10 | 74.3 | −16.3 |
| 2 | 44.6 | 17.8 | 11.5 | 1.52 | 51.6 | −14.6 |
| 3 | 69.5 | 38.0 | 8.9 | 0.94 | NONE | +16.3 |
| 4 | 31.3 | 10.9 | 1.0 | 1.0 | NM | NM |
| 5 | 30.8 | 10.7 | 0.4 | 0.40 | NM | NM |
| 6 | 68.4 | 36.8 | 2.8 | 0.84 | NM | NM |
| 7 | 70.1 | 38.7 | 6.0 | 1.08 | NM | NM |
| 8 | 47 | 20 | 0.8 | 1.5 | NM | NM |
| 9 | 69 | 39 | 1.8 | 1.5 | NM | NM |

NM = not measured

Additional Blend/Foam Components

LDPE-1=LDPE ($I_2$ of 2.4 g/10 min and a $\rho$ of 0.924 g/cm$^3$).

(Suffix B), and DIN 53572, respectively. Measure dynamic cushioning C-factors in accordance with ASTM D1596.

Measure compressive recovery by compressing the foam by 90% of its original thickness, releasing the load and measuring the recovery after 24 hours.

As shown by the data in Table 3, the foaming temperature window with PE/ESI blends is as wide as 4° C. (for a specific composition), much larger than a typical 1° C. or smaller foaming window for LDPE. It is also surprising that the LDPE/ESI blends foam at temperatures as high as 101–110° C., since this temperature range is well above the $T_g$ and crystalline melting temperatures of the ESI resins.

Examples 1a to 1r show that blends of the present invention readily provide stable foams with open cell contents that range from 10 to 61 vol %. This contrasts with extruded LDPE foams that typically have an upper open cell limit of 20 vol % for stable foams. This follows from a rapid viscosity drop once temperatures exceed LDPE crystalline melting points. The viscosity drop leads, in turn, to foam collapse after the die.

Examples 1b to 1e show that use of ESI-3 in blends with LDPE results in significantly slower permeation of isobutane out of the foams, even when glycerol monostearate is absent and the open cell content is as high as 26 vol % (versus Comp Ex A and B). This shows that blends of the present invention provide dimensionally stable foams even in the absence of permeability modifiers.

The data in Table 3 show that foams of the present invention have smaller cells than reference foams made with LDPE (Comp Ex A and B). Foams 1e–1i, 1k–1o and 1q–1r have significantly lower hardness than the LDPE foams of Comp Ex A and B. The improved softness and cell structure, combined with smoother skin (the latter obtained with ESI-2 and 3, not ESI-1), are aesthetically more appealing and functionally desirable for soft touch, low abrasion applications such as materials handling of automotive parts. Note that ESI-2 and ESI-3 have copolymer styrene contents greater than 15 mol %, while ESI-1 had a copolymer styrene content of 10.8 mol %.

Further, some LDPE/ESI blends (particularly those made with ESI-1 and ESI-3) result in improved cushioning (lower C-factor) relative to foams made from LDPE alone. Calculate optimum C-factor at the static load corresponding to the lowest G-values using the formula: C=(G-value x Thickness of Foam)/(Drop Height) where the G-value is determined according to ASTM D1596 by dropping a load on foam after aging the foam for 28 days at room temperature.

TABLE 3

Foams of Example 1

| Ex/CE | A | B | 1a | 1b | 1c | 1d | 1e | 1f | 1g | 1h |
|---|---|---|---|---|---|---|---|---|---|---|
| LDPE-1 (wt %) | 100 | 100 | 75 | 75 | 50 | 50 | 50 | 75 | 75 | 75 |
| ESI-1 (wt %) | — | — | — | — | — | — | — | — | — | — |
| ESI-2 (wt %) | — | — | — | — | — | — | — | 25 | 25 | 25 |
| ESI-3 (wt %) | — | — | 25 | 25 | 50 | 50 | 50 | — | — | — |
| Foaming Temp (° C.) | 111 | 111 | 109 | 105 | 103 | 101 | 103 | 110 | 109.5 | 109 |
| Isobutane (phr) | 8 | 10 | 8 | 8 | 10 | 10 | 10 | 8 | 8 | 8 |
| Nucleator (phr) | 0.2 | 0.2 | 0.2 | 0.2 | 0.2 | 0.2 | 0.2 | 0.1 | 0.1 | 0.1 |
| ρ (kg/m$^3$)* | 32.6 | 29.7 | 35.9 | 37.3 | 27.2 | 26.5 | 27.7 | 35.2 | 34.5 | 34.2 |
| Open cell vol % | 13.9 | 17.7 | 28.8 | 10.7 | 19.9 | 20.2 | 25.9 | 50.1 | 50.6 | 45.7 |
| 3D Avg. cell size (mm) | 1.32 | 1.23 | 0.95 | 0.88 | 0.84 | 0.84 | 0.89 | 0.99 | 0.96 | 1.02 |
| Isobutane wt %* | 0.87 | 0.63 | 0.43 | 1.30 | 2.41 | 2.85 | 1.57 | 0.00 | 0.00 | 0.00 |
| Hardness (Asker C) | 33 | 28 | 29 | 33 | 29 | 29 | 27 | 23 | 23 | 23 |
| 10% avg comp str (kPa)* | 36 | 35 | 23 | 30 | 24 | NM | 29 | 21 | NM | NM |
| 25% avg comp str (kPa)* | 56 | 63 | 49 | 62 | 55 | NM | 50 | 40 | NM | NM |
| 50% avg comp str (kPa)* | 112 | 104 | 95 | 114 | 108 | NM | 105 | 83 | NM | NM |
| Compression set (%)* | 5.24 | 5.23 | 5.61 | 5.62 | 3.74 | NM | 3.94 | 1.72 | NM | NM |
| Comp recovery (%)* | 97.7 | 97.2 | 97.6 | 97.9 | 98.6 | NM | 98.7 | 97.8 | NM | NM |
| 1$^{st}$ drop C-factor* | 3.43 | 3.53 | NM | 2.81 | 3.17 | NM | NM | NM | NM | NM |
| 2$^{nd}$ drop C-factor* | NM | NM | NM | NM | NM | NM | NM | NM | NM | NM |
| Surface (R/S)** | R | R | S | S | S | S | S | S | S | S |

| Ex/CE | 1i | 1j | 1k | 1l | 1m | 1n | 1o | 1p | 1q | 1r |
|---|---|---|---|---|---|---|---|---|---|---|
| LDPE-1 (wt %) | 75 | 75 | 50 | 50 | 50 | 50 | 75 | 75 | 50 | 50 |
| ESI-1 (wt %) | — | — | — | — | — | — | 25 | 25 | 50 | 50 |
| ESI-2 (wt %) | 25 | 25 | 50 | 50 | 50 | 50 | — | — | — | — |
| ESI-3 (wt %) | — | — | — | — | — | — | — | — | — | — |
| Foaming temp (° C.) | 108.5 | 106 | 105 | 104 | 103 | 101 | 109 | 107 | 106 | 105 |
| Isobutane (phr) | 8 | 8 | 10 | 10 | 10 | 10 | 8 | 8 | 10 | 10 |
| Nucleator (phr) | 0.1 | 0.1 | 0.2 | 0.1 | 0.1 | 0.1 | 0.2 | 0.2 | 0.2 | 0.2 |
| ρ (kg/m$^3$)* | 33.3 | 32.7 | 29.2 | 27.5 | 27.7 | 26.5 | 38.1 | 37.5 | 30.9 | 30.3 |
| Open cell vol % | 37.8 | 19.9 | 60.9 | 53.2 | 49.3 | 34.0 | 19.5 | 11.7 | 57.9 | 55.8 |
| 3D Avg. cell size (mm) | 1.02 | 1.06 | 0.75 | 0.84 | 0.83 | 0.85 | 1.08 | 1.10 | 0.95 | 1.00 |
| Isobutane wt %* | 1.02 | 0.88 | 0.00 | 0.14 | 0.20 | 0.40 | 0.15 | 0.95 | 0.00 | 0.03 |
| Hardness (Asker C) | 24 | 28 | 14 | 19 | 20 | 20 | 27 | 32 | 17 | 17 |
| 10% avg comp str (kPa)* | NM | 29 | NM | 19 | NM | 20 | NM | 39 | NM | 14 |
| 25% avg comp str (kPa)* | NM | 49 | NM | 36 | NM | 38 | NM | 56 | NM | 31 |
| 50% avg comp str (kPa)* | NM | 100 | NM | 88 | NM | 92 | NM | 108 | NM | 79 |
| Compression set (%)* | NM | 5.63 | 3.71 | NM | 3.06 | NM | 7.55 | NM | 5.60 | |
| Comp recovery (%)* | NM | 97.8 | NM | 98.5 | NM | 98.9 | NM | 97.2 | NM | 98.1 |

TABLE 3-continued

| Foams of Example 1 | | | | | | | | | | |
|---|---|---|---|---|---|---|---|---|---|---|
| 1st drop C-factor* | NM | 3.62 | NM | NM | NM | 4.41 | NM | 3.39 | NM | 2.76 |
| 2nd drop C-factor* | NM | NM | NM | NM | NM | NM | NM | NM | NM | 3.05 |
| Surface (R/S)** | S | S | S | S | S | S | R | R | R | R |

*Properties after 28 days aging; R = rough; S = smooth; comp = compressive; avg = average; str = stress; NM = not measured

EX 2 AND COMP EX C AND D

Replicate Ex 1 with a larger scale extrusion foaming line, using formulation and process changes as shown in Table 4. Measure creep using ASTM D3573-93 (Suffix BB).

TABLE 4

| CE/Ex | C | D | 2a | 2b |
|---|---|---|---|---|
| LDPE-2 (wt %) | 100 | 100 | 70 | 70 |
| ESI-7 (wt %) | 0 | 0 | 30 | 30 |
| Foaming Temp (° C.) | 109.2 | 109.2 | 105.3 | 105.3 |
| Isobutane (phr) | 8 | 12 | 8 | 12 |
| Antioxidant (phr) | 0.047 | 0.047 | 0.054 | 0.054 |
| Talc (phr) | 0.5 | 0.1 | 0.5 | 0.1 |
| Glycerol monostearate (phr) | 0.22 | 0.35 | 0.22 | 0.35 |
| ρ (pcf/kg/m3) | 2.17/34.8 | 1.47/23.6 | 1.94/31.1 | 1.32/21.2 |
| Plank thickness (in/min) | 1.88/48 | 1.38/35 | 1.64/42 | 1.94/49 |
| Plank width (in/mm) | 25.0/635 | 25.8/655 | 26.3/668 | 29.3/744 |
| Skin | Rough | Rough | Smooth | Smooth |
| 3D Avg Cell Size (mm) | 1.29 | 3.83 | 1.76 | 2.36 |
| Hardness (Asker C), without skin | 21 | 9 | i8 | 9 |
| Vol % Open Cell | 7.3 | 16.5 | 6.5 | 16.3 |
| Comp Set % | 21.6 | 16.2 | 18 | 11.5 |
| Comp Creep % (3 wks @ 2 psi) | 10 | — | 6 | — |
| Comp creep % (3 wks @ 1.5 psi) | — | 44 | — | 23 |
| Compressive recovery (%) | 97.4 | 98.2 | 98.1 | 98.1 |

The data in Table 4 show that the foams made from blends of LDPE with ESI-7 (examples 2a and 2b) exhibit the following improvements over the comparative foams C and D: smoother skin, lower density at a fixed amount of blowing agent, decreased compression set and less compression creep.

EX 3

Polypropylene/ESI Blends

Use a Haake mixing bowl operating at 50 revolutions per minute (rpm) and a temperature of 190–200° C. for 8 minutes to prepare melt blends of PP and ESI resins. Conduct melt strength tests of the blends as well as neat PP, ESI and LDPE resins at 190° C. The tests involve pulling strands of molten polymer at constant acceleration until draw resonance or breakage occurs. The tests use a capillary rheometer and a Rheotens apparatus as take-up device. Record the force required to uniaxially extend the strands as a function of the take-up velocity. The maximum force attained before draw resonance or breakage occurs equals melt strength. Test conditions include a mass flow rate of 1.35 grams per minute, a temperature of 190° C., a capillary length of 2.1 mm, a piston diameter of 9.54 mm, a piston velocity of 0.423 mm/second (mm/sec), a draw-down distance (die exit to take-up wheels) of 100 mm, an acceleration of 2.4 mm/sec$^2$, and cooling with ambient air.

Table 5 summarizes the test results. The data show that PP/ESI blends have improved melt elongation (as measured by velocity) relative to neat PP, and similar to that of neat LDPE and ESI (these two polymers are easier to foam than PP). This should translate to improvements in ability to make polymer foams from PP.

TABLE 5

| Melt Property Test Results | | | |
|---|---|---|---|
| Polymer | $I_2$ (dg/min) | Melt Strength (centi-Newtons) | Velocity (mm/s) |
| PP-1 | 1.05 | 42 | 48 |
| PP-2 | 0.16 | 28 | 23 |
| LDPE-3 | 2.04 | 8 | 185 |
| ESI-4 | 0.98 | 6 | 237 |
| 75/25 PP-1/ESI-4 Blend | N/A | 9 | 204 |
| 75/25 PP-2/ESI-4 Blend | N/A | 9 | 105 |

EX 4

Using an extrusion foaming apparatus similar to that used in Example 1 and a strand foam die, prepare foam planks in a coalesced foam strand configuration from the compositions shown in Table 6 at the foaming temperatures shown in Table 6. The compositions also include talc, calcium stearate and Irganox™ 1010, each at a loading of 0.6 phr per 100 parts by weight of polymer blend, and 5.9 phr isobutane as a blowing agent. The die has a plurality of 0.042 inch (1.07 mm) apertures spaced 0.144 inch (0.36 cm) apart.

Table 6 also summarizes a number of foam properties (measured after aging for seven days at room temperature (nominally 23° C.)). The data for cell size and compressive strength represent an average of three directional values (length, width and thickness). Measure compressive set (at 50% compression) according to ASTM Test D3575-93.

TABLE 6

| Ex No | Foam Composition | Foaming Temp (° C.) | Density (pcf/-kg/m³) | Open Cells (Vol %) | Cell Size (mm) | Compressive Strength (psi/kPa) | Compression Set (%) |
|---|---|---|---|---|---|---|---|
| 4a | 75/25 PP-1/ESI-5 | 152 | 3.28/52.5 | 40.0 | 0.83 | 24.0/165 | 33.2 |
| 4b | 75/25 PP-1/ESI-5 | 151 | 3.22/51.6 | 39.2 | 0.81 | 22.3/154 | 33.0 |
| 4c | 75/25 PP-1/ESI-5 | 149 | 3.05/48.9 | 24.4 | 0.79 | 22.6/156 | 32.8 |
| 4d | 75/25 PP-1/ESI-5 | 147 | 3.10/49.7 | 22.2 | 0.92 | 22.8/157 | 33.0 |
| 4e | 50/50 PP-1/ESI-5 | 146 | 3.45/55.3 | 85.5 | 0.67 | 9.7/67 | 12.4 |
| 4f | 50/50 PP-1/ESI-5 | 144 | N/A | 2.9 | 0.69 | N/A | N/A |
| 4g | 75/25 PP-1/ESI-6 | 153 | 2.74/43.9 | 71.8 | 0.73 | 15.3/105 | 30.9 |
| 4h | 50/50 PP-1/ESI-6 | 151 | 2.56/41.0 | 63.2 | 0.66 | 14.4/99 | 31.2 |
| 4i | 50/50 PP-1/ESI-6 | 148 | 2.43/41.9 | 30.4 | 0.70 | 16.3/112 | 31.2 |
| 4j | 50/50 PP-1/ESI-6 | 146 | 2.43/41.9 | 22.5 | 0.70 | 15.8/109 | 31.0 |
| 4k | 50/50 PP-1/ESI-6 | 146 | 3.21/51.4 | 88.3 | 0.74 | 9.2/62 | 23.3 |
| 4l | 50/50 PP-1/ESI-6 | 144 | 2.89/46.3 | 78.7 | 0.73 | 8.6/59 | 25.1 |

The data in Table 6 show that blends of PP-1 with ESI-5 and ESI-6 yield stable, low density foams with open cell contents ranging from 22 to 88 vol %. The foaming temperature windows are as wide as 7° C. An increase in ESI-5 and ESI-6 content from 25 wt % to 50 wt % results in lower compressive strength (also known as compression deflection) and decreased compression set. Lower values of compressive strength also suggest softer foams.

EX 5 AND COMP EX E AND F

Replicate Ex 2 to prepare blends of LDPE-2 and either ESI-8 or ESI-9 as shown in Table 7 using isobutane as a blowing agent at a concentration of 7.5 phr.

TABLE 7

| Ex/-Comp Ex | Foam Composition | Foaming Temp (° C.) | Foam Density (pcf/-kg/m³) | Open Cell (Vol %) |
|---|---|---|---|---|
| 5a | 50/50 LDPE-2/ESI-8 | 106 | 2.38/38.1 | 7.0 |
| E | 20/80 LDPE-2/ESI-8 | 67 | 38.67/619 | 61.5 |
| 5b | 50/50 LDPE-2/ESI-9 | 104 | 1.95/31.2 | 3.2 |
| F | 20/80 LDPE-2/ESI-9 | 82 | 41.98/672 | 53.9 |

The data in Table 7 show that a high ESI content (greater than 60 wt % based on the combined weights of Components A and B) leads to foam collapse.

Similar results follow from other blend compositions, blowing agents and additive combinations, all of which are disclosed herein.

What is claimed is:

1. A polymer foam having a crosslinked gel content of no greater than 10 percent, and a density of no greater than 250 kilograms per cubic meter, wherein at least 70 percent by weight of polymers in the foam comprises a blend of:
   (A) from 5 to 60 percent by weight, based on the combined weight of components (A) and (B), of at least one substantially random interpolymer having a melt index of 0.05 to 1000 grams per 10 minutes, either a crystalline melting point or a glass transition temperature of about 80° C. or less, whichever is appropriate, and having:
      (1) from 8 to 65 mole percent of its monomeric units derived from;
         (a) at least one vinyl or vinylidene aromatic monomer, or
         (b) at least one sterically hindered aliphatic or cycloaliphatic vinyl or vinylidene monomer, or
         (c) a combination of at least one aromatic vinyl or vinylidene monomer and at least one sterically hindered aliphatic or cycloaliphatic vinyl or vinylidene monomer, and
      (2) from 35 to 92 mole percent of its monomeric units derived from ethylene, an aliphatic α-olefin containing from 3 to 20 carbon atoms, or a mixture thereof; and having at least 80 mole percent of its monomeric units derived from (1) and (2); and
   (B) from 95 to 40 percent by weight, based on the combined weight of components (A) and (B), of at least one polymer having no monomeric units derived from (1)(a), (1)(b), or (1)(c), and at least 80 mole percent of its monomeric units derived from monomers selected from ethylene, aliphatic α-olefins containing from 3 to 20 carbon atoms, and aliphatic α-olefins having from 3 to 20 carbon atoms and containing polar groups.

2. The foam of claim 1, wherein (A) has polymerized therein from 15 to 65 mole percent of (1) and 85 to 35 mole percent of (2), both percentages being based upon combined moles of (1) and (2) and totaling 100 mole percent.

3. The foam of claim 1 or claim 2, wherein the foam has an open cell content of at least 20 volume percent.

4. The foam of claim 1 or claim 2 wherein (A)(1) is styrene, and (A)(2) is ethylene.

5. The foam of claim 1 or claim 2, wherein (B) is at least one ethylene homopolymer or copolymer having a density of less than 0.94 grams per cubic centimeter and a melt index of from 0.01 to 100 grams per 10 minutes.

6. The foam of claim 1 or claim 2, wherein (B) is at least one polypropylene homopolymer or polypropylene copolymer having a melt flow rate of from 0.01 to 100 grams per 10 minutes.

7. The foam of claim 1 or claim 2, wherein component (B) additionally contains from 1–20 mole percent of monomeric units derived from at least one ethylenically unsaturated polymerizable monomer other than an aliphatic α-olefin that contains from 3 to 20 carbon atoms.

8. The foam of claim 1 or claim 2, wherein component (A) additionally contains from 1–20 mole percent of polymer units derived from at least one ethylenically unsaturated polymerizable monomer other than (A)(1) or (A)(2).

9. The foam of claim 1, wherein the density is at least 5 kilograms per cubic meter.

10. The foam of claim 4 wherein component (A) has at least 27 mole percent of it monomeric units derived from styrene.

11. The foam of claim 1, further comprising at least one nucleating agent selected from calcium carbonate, talc, calcium stearate, zinc stearate, clay, silica, barium stearate, calcium stearate, zinc stearate, diatomaceous earth, citric acid, sodium bicarbonate, and mixtures thereof.

12. The foam of claim 1, further comprising at least one additive selected from inorganic fillers, pigments, antioxidants, acid scavengers, ultraviolet absorbers, flame retardants, processing aids, extrusion aids, permeability modifiers, anti-static agents, other thermoplastic polymers, and mixtures thereof.

13. The foam of claim 1, wherein the foam has defined therein a multiplicity of channels, the channels being free of direction with respect to the longitudinal extension of the foam and enhancing or accelerating a gaseous permeation exchange wherein blowing agent exits from the foam and air enters into the foam.

14. The foam of claim 1 or claim 2, wherein (B) is at least one of a polyethylene homopolymer having a density of less than 0.94 g/cc and a melt index of from 0.01 to 100 grams per 10 minutes, a polypropylene homopolymer, an ethylene-vinyl acetate copolymer, or an ethylene-acrylic acid copolymers.

15. The foam of claim 1 or claim 2, wherein the foam has a shape that is a plank with a thickness of at least 20 millimeters and width of at least 50 millimeters, a sheet with a thickness of at least 1 millimeters and width of at least 1000 millimeters or a rod having a diameter of at least 40 millimeters.

16. The foam of claim 1 or claim 2, wherein the foam is shaped as thermoplastic foam beads or as expanded and fused thermoplastic foam beads and the beads or expanded and fused thermoplastic foam beads have an Asker C hardness of less than 80.

17. The foam of claim 1 or claim 2, wherein the foam is a unitary foam structure that is a coalesced strand foam.

18. The foam of claim 1 or claim 2, wherein component (B) is a polypropylene that is modified by at least one coupling agent.

19. The foam of claim 18, wherein the coupling agent is an azide compound.

* * * * *